Patented Oct. 22, 1946

2,409,663

UNITED STATES PATENT OFFICE 2,409,663

AMINO ALCOHOL ESTERS OF ALKYL-SUBSTITUTED ALKOXY BENZOIC ACIDS

Walter G. Christiansen, Glen Ridge, and Sidney E. Harris, Nutley, N. J., assignors to E. R. Squibb & Sons, New York, N. Y., a corporation of New York No Drawing. Original application September 9, 1937, Serial No. 163,034. Divided and this application June 28, 1944, Serial No. 542,622

4 Claims. (Cl. 260—473)

This application is a division of our application Serial No. 163,034, filed September 6, 1937.

This invention relates to, and has for its object the provision of, certain amino alcohol esters of oxy-benzoic acids, and acid-addition salts thereof. These esters have the general formula

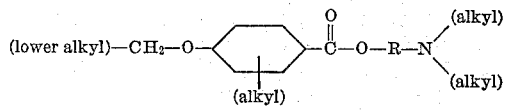

wherein R represents a divalent radical providing a continuous carbon bridge, preferably an alkylene radical.

The compounds of this invention are valuable therapeutic agents, being particularly effective for inducing local anesthesia.

In the practice of this invention, an aracyl halide of the general formula

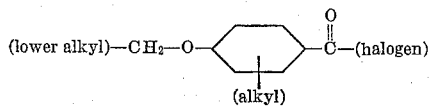

is reacted with an alcohol of the formula

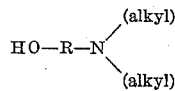

to produce the desired ester.

The amino-esters of the invention are generally recovered in the form of their addition salts with hydrochloric acid. However, other acids forming addition-salts with amines may be used in place of hydrochloric; such acids are boric, nitric, lactic, tartaric, citric, phosphoric, sulfuric, picric, and picrolonic. The addition salts may be converted into the free bases in the usual manner.

The following examples are illustrative of the invention:

EXAMPLE 1

β-diethylamino-ethyl ester of 3-methyl-4-ethoxy-benzoic acid 13 g. of 3-methyl-4-ethoxy-benzoic acid and 15 g. of phosphorus pentachloride are heated on a steam bath for 30 minutes, and then fractionally distilled in vacuo, the fraction 3-methyl-4-ethoxy-benzoyl chloride being obtained as a colorless liquid boiling at 147–152° C./6 mm. A solution comprising 6.5 g. of this fraction dissolved in 16 cc. of dry benzene is mixed with 7.5 g. of diethylamino-ethanol dissolved in 18 cc. of dry benzene, and the mixture boiled for 60 minutes; cooling the reaction mixture causes a white crystalline precipitate of β-diethylamino-ethanol hydrochloride to separate out completely; then filtering, treating the filtrate with alcoholic hydrochloric acid, and distilling off the benzene and alcohol, leaves a white solid residue which upon recrystallization from a mixture of absolute alcohol and dry ether, yields the hydrochloride of the desired product as a white crystalline precipitate having a melting point of 142.5–145° C.

EXAMPLE 2

β-diethylamino-ethyl ester of 2-methyl-4-ethoxy-benzoic acid 7.5 g. of 2-methyl-4-ethoxy-benzoic acid is warmed with 8.6 g. of phosphorus pentachloride until the reaction ceases; fractional distillation of the reactants under reduced pressure yields 2-methyl-4-ethoxy-benzoyl chloride as a colorless liquid boiling at 138–140° C./3 mm. A solution of 6 g. of this fraction in 20 cc. of dry benzene is treated with 7.6 g. of β-diethylamino-ethanol dissolved in 10 cc. of dry benzene, and crystals of diethylamino-ethanol hydrochloride separate out; filtering off the precipitate, treating the filtrate with alcoholic hydrochloric acid and diluting it with dry ether, yields the hydrochloride of the desired ester as a white crystalline solid melting at 101–103° C.

EXAMPLE 3

Gamma-dimethylamino-propyl ester of 3-methyl-4-butoxy-benzoic acid 1.53 g. gamma-dimethylamino-propanol and 3.17 g. 3-methyl-4-n-butoxy-benzoyl chloride are dissolved in 10 cc. of dry alcohol-free chloroform. The solution is warmed on a steam bath for half an hour and the product precipitated as the hydrochloride by adding dry ether; it may be purified by redissolving in chloroform or absolute alcohol and reprecipitating. The product is a white crystalline powder melting at 125.5–126.5° C. (corrected).

EXAMPLE 4

α,α-Di(dimethylaminomethyl)-gamma-phenyl-n-propyl ester of 3-methyl-4-n-butoxy-benzoic acid (hydrochloride)

36 g. of the ethyl ester of 3-methyl-4-hydroxy-benzoic acid and 27.4 g. of n-butyl bromide dissolved in 200 cc. acetone are treated with 84 g. anhydrous potassium carbonate, and the reaction mixture is then refluxed, with stirring, for 15 hours. The potassium carbonate and potassium bromide precipitated are filtered off, the acetone distilled from the filtrate, and the residue boiled with dilute sodium hydroxide solution until dissolved. The product, 3-methyl-4-n-butoxy-benzoic acid, is precipitated with hydrogen chloride; and after filtering, washing and drying the precipitate, and recrystallizing from 60% alcohol, is obtained in the form of white plates melting at 144–146° C. (corrected).

15 g. of this acid is treated with 15 g. phosphorus pentachloride to about 70° C. until hydrogen chloride is no longer evolved, and the reaction mixture is fractionally distilled in vacuo. The product, 3-methyl-4-n-butoxy-benzoyl chloride boils at 144–154° C. at 1.5 mm.

1.05 g. of 3-methyl-4-n-butoxy-benzoyl chloride and 1.25 g of α,α-di(dimethylaminomethyl)-gamma-phenyl-propanol are dissolved in 10 cc. of chloroform and the solution is refluxed for a few minutes. Dry ether is added until a faint precipitate appears, and the whole is allowed to stand for sometime. The crystalline precipitate formed is filtered off and washed with dry ether; it melts at 161–162° C. (corrected).

Example 5

*α-Methyl-α-dimethylaminomethyl-n-amyl ester of 3-methyl-4-n-butoxy-benzoic acid (hydrochloride)*

4.4 g. of 3-methyl-4-n-butoxy-benzoyl chloride and 3.0 g. of α-methyl-α-dimethylaminomethyl-n-amyl alcohol are reacted together in 10 cc. of chloroform as directed in Example 4. The product melts at 126–131° C. (corrected).

The following are among the many other compounds embraced by the present invention, and may be prepared according to the directions given above:

6. α-methyl-α-dimethylaminomethyl-gamma-phenyl-n-propyl ester of 3-methyl-4-n-butoxy-benzoic acid.

7. α,α-Di-dimethylaminomethyl-n-amyl ester of 3-methyl-4-n-butoxy-benzioc acid.

8. β-Dimethylamino-n-propyl ester of 3-methyl-4-propoxy-benzoic acid.

9. Gamma-diethylamino-n-propyl ester of 3-ethyl-4-n-propoxy-benzoic acid.

10. Delta-diethylamino-n-butyl ester of 3-methyl-4-n-butoxy-benzoic acid.

The invention may be variously otherwise embodied, within the scope of the appended claims.

We claim:

1. A compound of the group consisting of: amino-esters of the formula

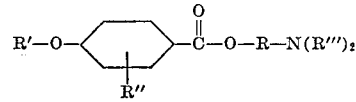

wherein R represents a divalent alkyl residue with 2 to 4 carbon atoms R' represents an alkyl residue with 2 to 4 carbon atoms, R'' represents an alkyl residue with 1 to 2 carbon atoms, and R''' represents an alkyl residue with 1 to 2 carbon atoms; and acid-addition salts thereof.

2. The hydrochloride of β-diethylamino-ethyl 3-methyl-4-ethoxy-benzoic acid.

3. The hydrochloride of β-diethylamino-ethyl 2-methyl-4-ethoxy-benzoic acid.

4. The hydrochloride of gamma-dimethylamino-propyl 3-methyl-4-n-butoxy-benzoate.

WALTER G. CHRISTIANSEN.
SIDNEY E. HARRIS.